Patented Sept. 13, 1949

2,482,042

UNITED STATES PATENT OFFICE 2,482,042

OXYCELLULOSE PRODUCTS, THEIR MANUFACTURE AND UTILIZATION

William H. Van Delden, Cedar Grove, and John B. Rust, Montclair, N. J., assignors to Montclair Research Corporation, a corporation of New Jersey No Drawing. Application March 21, 1945, Serial No. 584,043

3 Claims. (Cl. 260—212)

The present invention relates to degraded or partially degraded oxycellulose products, to methods of making them, to methods of utilizing such products, particularly as sizing materials, and sized and otherwise treated materials carrying such products.

Previous efforts in the art to produce water-insoluble, cellulosic degradation products which may be dissolved in dilute alkali solutions to form solutions or dispersions of a definite, satisfactory consistency and viscosity, capable of producing water-insoluble continuous coherent films upon precipitation, have not been satisfactory. This is particularly true with prior art methods utilizing acids wherein the degradation has been carried so far that the resulting cellulose products are degraded to a point where the product is incapable of forming coherent films or films which do not disintegrate in the coagulating bath, etc.

Among the objects of the present invention is the production of degraded or partially degraded and oxidized cellulosic materials which with refrigeration, are soluble or at least partially soluble or dispersible in dilute aqueous solutions of alkalies.

Other objects include the production of such water-insoluble cellulosic degradation products which may be dissolved in dilute alkali solutions to form solutions or dispersions of a definite satisfactory consistency and viscosity capable of forming water-insoluble but continuous coherent films upon precipitation.

Other objects include the production of textile treating or sizing and paper treating or sizing or related products.

Still further objects include the sized materials, treated textiles, treated paper, etc., utilizing the products set forth above.

Still further objects and advantages will become apparent from the more detailed description set forth below, it being understood, however, that such detailed description is given by way of explanation and illustration only, and not as limiting, since various changes therein may be made by those skilled in the art without departing from the scope and spirit of the present invention.

In accordance with the present invention products are prepared by degrading cellulose with aqueous solution of bases in the presence of oxidizing agents under controlled conditions of temperature in order to form a cellulosic product which as a 1% solution in an 8% sodium hydroxide solution has a viscosity between 1.9 and 4 centipoises at 28.5° C. Such products have been found to have the desirable properties for the purposes in hand, and to yield solutions or dispersions in dilute alkali solutions, of definite consistency and viscosity, which are capable of forming water-insoluble continuous coherent films upon precipitation.

The bases employed are desirably sodium, potassium, lithium hydroxides, ammonium hydroxide or quaternary ammonium bases including trimethyl benzyl ammonium hydroxide, tetraethyl ammonium hydroxide, diethyl dipropyl ammonium hydroxide, diethyl piperidinium hydroxide, methyl pyridinium hydroxide, and the like.

The temperatures employed at which the treatment is carried out are preferably between about 25° C. and the boiling point of the liquids present in the materials undergoing treatment. Generally the temperatures employed will be between about 25° C. and 100° C.

As examples of oxidizing agents which may be used in the process there may be mentioned sodium perborate, hydrogen peroxide, ammonium persulfate, oxygen, ozone, sodium chlorite, sodium peroxide, potassium chlorate, benzoyl peroxide, urea peroxide, and the like. The oxidizing agent is thus preferably water-soluble, or at least soluble in alkalies, or in the media in which the treatment is being carried out.

Thus the process involves the treatment of the cellulosic material with an aqueous solution of an alkali hydroxide and an oxidizing agent at the stated temperatures, the treatment being carried out until the specified product indicated above is obtained. The conditions may vary materially within the features referred to above.

Cellulose in any of its various forms may be used in carrying out the present invention to form alkali cellulose. The cellulose is first mixed with an excess of the alkali solution and steeped. The concentration of the alkali may vary from about 15% to 50%. It is preferable to employ a concentration of about 20%. The soda cellulose may desirably be aged first, before introducing the oxidizing agent. This aging may take place at any temperature between ice temperature and boiling. The period of aging may vary widely from a few hours to a month or more.

Alternatively, it may be found desirable to add the oxidizing agent at once after preparing the soda cellulose and to react the mixture at any temperature between, for example, about 25° C. and the boiling point, in the presence of the oxidizing agent. Or, the oxidizing agent may first be dissolved in the alkali solution before adding the cellulose to the latter or carrying out the impregnation or steeping operation.

The period of steeping or impregnation is governed generally by the concentration of the steeping liquor, and by the particular form of cellulose used. Thus, while shredded cellulose may be pressed shortly after impregnation, it may be desirable to steep for hours or even days when cellulose pulp board is being used. The temperature of the impregnating step may vary from ice temperature to that of boiling or may be varied during the steeping process depending upon the properties of the final product desired.

After the steeping process has been completed and thorough impregnation is assured, the material may be pressed to free it from excess steeping liquor. The amount of pressure applied varies with the amount of steeping liquor it is desired to retain in the press cake, but usually it is preferred to press to not more than about five times the original weight of the cellulose, and generally the material after such pressing operation will be from two to about five times the original weight of the cellulose treated. In the instances where the oxidizing agent is added immediately to the impregnating solution, the amount of oxidizing agents added to the alkali solution is regulated in such a manner that the desired quantity of such oxidizing agents will be present in the pressed cellulose mixture. The pressed cellulose-alkali mixture will be hereafter defined as soda cellulose and the soda cellulose containing oxidizing agents will be defined as activated soda cellulose.

The reaction period in the presence of the oxidizing agent may vary widely from a few hours to a day or more, depending upon the temperature. It is not essential to use one temperature of treatment throughout the operation, but temperature may be changed from one temperature to another during the course of the reaction period and this will be illustrated in examples given below.

The consistency and viscosity of the final product in alkali solution will be determined by the type of oxidizing agent, the time and temperature of aging, the duration and temperature of contact with the oxidizing agent, as well as the type of cellulose used, and all of these factors enter into a determination of the characteristics of the products obtained.

After the material has been sufficiently degraded, the reaction mixture is acidified. It may be adjusted, for example, to a pH of about 5 with dilute acids, whereby the product is coagulated and can be filtered, washed and dried. The dried product is capable of dissolving in dilute aqueous alkalies to form a homogeneous solution or dispersion on cooling. The alkalies used for preparing solutions may be the same as those listed above for utilization in the steps of degradation of cellulose. However, it should be understood that it is not necessary to use the same alkali for both operations. To form a solution, it is preferable to mix the cellulose first thoroughly with the alkali solution and then add ice to dilute the mixture to the desired concentration. Or the cellulose may be mixed with dilute aqueous alkali, and then cooled in a freezing mixture, which may be accompanied with freezing or crystal formation of the cellulose dispersion. Or, it may be preferred not to acidify and coagulate the reaction mass, but upon cooling add dilute sodium hydroxide and ice in sufficient quantities to obtain the desired concentration. Or, dilute sodium hydroxide may be mixed with the cooled reaction mass, and the thoroughly homogenized dispersions may be cooled by means of a freezing mixture, which may be accompanied with freezing and crystallization of this dispersion. This method will hereafter be referred to as the direct solution method.

The direct solution method offers certain advantages over the method whereby the cellulose is coagulated. A brief outline of the direct solution method hereby referred to will serve to illustrate these advantages of such method over the coagulation method.

It is usually preferable to mix the cellulose with sufficient dilute aqueous alkali to insure thorough wetting. As explained above, the oxidizing agent may be previously dissolved in or mixed with the alkali solution, or it may be added to the cellulose-alkali mixture after complete impregnation has taken place. The period and temperature of aging and reacting may be regulated and carried out as in the coagulation method.

After the aging and reacting is completed, a solution may be effected by adding water, ice or aqueous alkali solutions or a combination of these three. However, a very convenient method consists in having sufficient water and alkali present in the original mixture so that a solution of the desired cellulose and alkali ratio and concentration may be produced by adding ice and/or water thereto. Since the alkali solution and ice will form a cooling mixture, temperatures of $-5°$ C. are easily obtained in this manner, and this drop in temperature will facilitate the dissolution of the cellulose material.

This method is extremely economical, since the pressing required to obtain soda cellulose in the coagulation method may be eliminated. Also no precipitating, washing and drying operations are required.

Since the washing process is eliminated, it is preferable to select an oxidizing agent which will not leave residual salts in the finished product. Examples of such oxidizing agents are hydrogen peroxide, atmospheric oxygen, and the like.

After sufficient degradation has been accomplished, it will be found usually that the oxidizing agent has been exhausted. However, the reaction may be terminated if desired by adding a suitable reducing agent. Examples of such reducing agents are formaldehyde, sodium sulfite, hydroxylamine, and the like.

Solutions made by the direct solution method are generally characterized by absolute homogeneity and greater body.

Textiles treated with these solutions, have a greatly improved appearance and exhibit a natural, smooth, soft yet firm hand. The fullness of the textile is greatly enhanced by this treatment.

Generally speaking, no plasticizing or softening agents will be required to achieve these highly desirable characteristics; although such materials may be added if desired.

In order to form a cellulosic degradation product which will yield a launderfast continuous coherent film on precipitation or coagulation, the reaction or degrading period is not interrupted until a satisfactory reduction in viscosity has taken place. In order to obtain a material which will perform satisfactorily, the degradation is controlled so that the viscosity characteristics of the cellulose products will range between narrow, sharply defined limits. These limits were determined for solutions containing 1% of the degraded cellulose material dissolved in 8% aqueous sodium hydroxide. If these solutions contained undissolved fiber or lint, the latter was removed by centrifuging. Determined in this way, it was found that the absolute viscosity should not be less than 1.9 centipoises nor more than 4 centiposies at a temperature of 28.5° C. The quantities of the oxidizing agent or agents to obtain these viscosities may be varied within very large limits, for instance, from 1% to about 50% based on the weight of the cellulose, depending on the nature of the oxidizing agent and on the degree of degradation desired.

The cellulose degradation products thus formed are soluble or dispersible in dilute alkalies; preferably with cooling, depending upon the degree of degradation. Thus a product may be prepared which yields an absolutely clear solution or the solution may in some circumstances contain a certain amount of fiber.

The solution of a strength or concentration of about 1 to 10% may be applied to the desired textile material, such as cotton, linen, rayon, etc., in any desired way as on a padder, squeezed, dried and coagulated by using a solution of an acid, acid salt or a precipitating concentrated salt solution. The treated textile is washed thoroughly after coagulation and then dried. The finish may be applied at practically any convenient stage of processing such as before kier boiling, before dyeing, and the like.

As textile sizing agents, the material may be applied on a padder, back filling machine or a quetch. Textiles treated in this manner have a firm hand and a pleasant soft feel to the touch. These properties are not impaired on laundering or treatment with the ordinary cleansing agents. The finish obtained is characterized by a degree of permanence and stability not previously obtainable. Moreover, the materials may be used as paper sizing and modifying agents.

In carrying out the present invention, it is possible to use ozone to great advantage on account of its solubility in alkaline solutions. Various expedients may be employed in this connection. Thus a mixture of cellulose and alkali may be treated with gaseous ozone at temperatures ranging from the freezing to the boiling point of this mixture. Or the mixture may first be saturated with ozone and subsequently be subjected to a temperature change in order to bring about the partial or complete dissolution of the cellulosic material. Another possible variation of the process utilizing ozone may be made by dissolving ozone in the alkali solution prior to mixing with the cellulose.

The general considerations set forth above for carrying out the procedure and variation of operating conditions, etc., may be utilized in these processes utilizing ozone as the oxidizing agent. As may be seen, numerous modifications may be made in this procedure, including variation of temperatures, the employment of increased pressure in order to raise the concentration of the gas in respect to the cellulose present, method and rate of addition of the ozone to the cellulose-alkali mixture, as well as a combination of these variables.

Ozone will be found particularly useful where washing is difficult, and where residual matter is objectionable.

The following examples are offered only by way of explanation and illustration. All parts are by weight.

*Example 1.*—458 parts of cellulose pulp board was impregnated with a solution containing 20% sodium hydroxide and 1% of potassium chlorate. The cellulose was steeped in this solution for 5 hours. At the end of this period the material was pressed until a weight three times that of the original cellulose was obtained. The material was reacted at 70° C. for 120 hours, then neutralized, washed with water and acetone, and dried. A white fibrous material was obtained which was soluble in dilute sodium hydroxide solutions on cooling.

*Example 2.*—62 parts of cellulose was steeped in 1000 parts of a solution, which contained 200 parts of sodium hydroxide and 14 parts of sodium perborate. The material was pressed after thorough impregnation had taken place to about three times the original weight of the cellulose. The product was then reacted for 5 hours at 80° C., and 24 hours at room temperature while frequent mixing. At the end of this period the material was suspended in water and acidified with dilute acetic acid. The precipitate was washed and dried. This cellulose product was a white, powdery substance which was readily dispersible in 5 to 10% sodium hydroxide solutions. A 4% solution thus made was viscous and contained some fibrous material.

*Example 3.*—183 parts of activated soda cellulose containing 34% of cellulose, 0.9% of sodium peroxide and 65.1% of 20% aqueous sodium hydroxide solution were heated for 5 hours at 80°. The mixture was acidified, washed and dried and a white, fluffy material was obtained. This material was soluble in 10% sodium hydroxide solution with cooling to give a viscous solution of 4% strength.

*Example 4.*—A clear solution of the degraded oxycellulose of Example 1 was made by mixing 8 parts of cellulose derivative with 80 parts of 20% sodium hydroxide solution, 32 parts of water and 80 parts of crushed ice. A piece of cotton percale was immersed in the solution, the excess solution squeezed out and the cloth dried. The textile was then passed through a bath containing 1.5% sulfuric acid and finally washed and dried. A firm hand was imparted to the cloth. No deterioration of this finish was observed upon laundering.

*Example 5.*—16 parts of cellulose were mixed with 160 parts of 20% sodium hydroxide solution containing 2 parts of ammonium persulfate. This mixture was heated at 100° C. for 2 hours, and then cooled to room temperature, at which temperature it was kept for 144 hours. At the end of this period, the material was neutralized with glacial acetic acid, washed with water and acetone, and dried. A white, fibrous product was obtained, which was soluble in dilute aqueous alkalies. A 4% solution of this material was viscous and contained a slight amount of fiber.

*Example 6.*—124 parts of cellulose sheet was immersed for 4 hours in a bath containing 2000 parts of 20% aqueous sodium hydroxide to which 20 parts of ammonium persulfate had been added. The sheets were pressed to five times their original weight and then reacted for 24 hours at 70° C. Sufficient ice and sodium hydroxide was added to form a 4% solution of cellulose in 8% sodium hydroxide. This solution was viscous and contained some fiber.

*Example 7.*—4 parts of the cellulose derivative formed in Example 6 was homogenized with a mixture of 40 parts of potassium hydroxide, 20 parts of water and 36 parts of crushed ice. The resulting dispersion was viscous and contained a considerable amount of fiber.

*Example 8.*—32 parts of cellulose in sheet form were mixed with 320 parts of a 20% aqueous sodium hydroxide solution. After aging this mixture for three hours at room temperature, a solution was added which contained 4 parts of potassium chlorate in 60 parts of water, and the mass thoroughly homogenized. The mixture was then heated at 100° C. for 2 hours and kept thereafter at room temperature for 144 hours. Then the cellulose was precipitated by acidification, was washed and dried. A white fibrous material was thus obtained. 4 parts of this material was mixed with 96 parts of a saturated solution of hydrated lithium hydroxide ($LiOH.H_2O$) in water and chilled in a freezing mixture. This solution was smooth, viscous and contained some fiber when it had attained room temperature.

*Example 9.*—16 parts of cellulose were mixed with a solution containing 32 parts of sodium hydroxide and 2 parts of sodium chlorite dissolved in 126 parts of water. The mixture was homogenized and heated on a boiling water bath for 2 hours. The material was cooled and the reaction was permitted to proceed for 36 hours at room temperature. The product was coagulated with acid, washed and dried. Medium viscosity solutions were formed when this material was mixed with dilute alkalies to form a 5% solution.

*Example 10.*—60 parts of cellulose in sheet form were impragnated with a 33% aqueous sodium hydroxide solution which had previously been aerated. After impregnating for 5 hours, the sheets were pressed so as to retain 130 parts of sodium hydroxide solution. The pressed material was then aged at constant temperature (19° C.) for 62 hours and thereafter heated at 50° C. for 96 hours. The sheets were then pulped up in water, neutralized, washed and dried. This material yielded low viscosity solutions in 10% sodium hydroxide. The solutions were free from fiber and did not contain any insoluble residue.

*Example 11.*—62 parts of cellulose were impregnated with a 20% sodium hydroxide solution containing 2.4% of 30% hydrogen peroxide. The cellulose was left in the impregnating bath for 5 hours. At the end of this period the cellulose was pressed to an increase of 230% and kept at about 25° C. for 96 hours. A solution containing 4% of cellulose and 8% sodium hydroxide was then prepared, by mixing 26.8 parts of the activated soda cellulose with 61.5 parts of 20% sodium hydroxide and 111.7 parts of crushed ice. A clear solution is formed in this manner, which has a medium viscosity at room temperature.

*Example 12.*—16 parts of cellulose were mixed thoroughly with 160 parts of 20% aqueous sodium hydroxide solution. After aging this mixture for 24 hours at room temperature, 6 parts of 30% hydrogen peroxide were added and the mixture was reacted for 2 hours at 100° C. with frequent stirring. The mass was then allowed to come to room temperature and was reacted an additional 96 hours at room temperature. Finally 218 parts of ice were added. A clear, fiberless solution of fairly low viscosity was thus obtained.

The following table gives the absolute viscosity of 1% solutions of some of the products of the above examples in 8% NaOH solution. As a basis for computation of relative viscosity, specific viscosity and molecular weight, it may be mentioned that an 8% NaOH solution has a viscosity of 1.4 centipoises.

|  | Centipoises |
|---|---|
| Example 1 | 2.1 |
| Example 2 | 2.9 |
| Example 3 | 3.1 |
| Example 5 | 3.8 |
| Example 9 | 2.9 |
| Example 10 | 1.9 |
| Example 11 | 3.0 |
| Example 12 | 2.1 |

Having thus set forth our invention, we claim:

1. In the process of making a degraded oxycellulose which is soluble by refrigeration in aqueous alkalies to yield solutions capable of forming continuous coherent films when coagulated, the steps of heating at a temperature between 25° C. and boiling, a mixture of cellulose and a 15 to 50% aqueous solution of an alkali hydroxide containing from 1 to 50% by weight on the cellulose of hydrogen peroxide until a 1% solution of the reacted cellulose in an 8% sodium hydroxide solution has a viscosity between 1.9 and 4 centipoises at 28.5° C.

2. A process as set forth in claim 1, wherein the hydrogen peroxide is generated in situ.

3. In the process of making a degraded oxycellulose which is soluble by refrigeration in aqueous alkalies to yield solutions capable of forming continuous coherent films when coagulated, the steps of impregnating 62 parts of cellulose with a 20% sodium hydroxide solution containing 2.4% of 30% hydrogen peroxide, permitting the cellulose to remain in the impregnating bath for 5 hours, then pressing the cellulose to an increase of 230% and permitting it to stand at about 25° C. for 96 hours to produce an activated soda cellulose, mixing 26.8 parts of said activated soda cellulose with 61.5 parts of 20% sodium hydroxide and 111.7 parts of crushed ice to produce a clear solution containing 4% of cellulose and 8% sodium hydroxide having a medium viscosity at room temperature.

WILLIAM H. VAN DELDEN.
JOHN B. RUST.

REFERENCES CITED

The following references are of record in the file of this patent:

UNITED STATES PATENTS

| Number | Name | Date |
|---|---|---|
| 1,036,282 | Lilienfeld | Aug. 20, 1912 |
| 2,335,126 | Lilienfeld | Nov. 23, 1943 |

FOREIGN PATENTS

| Number | Country | Date |
|---|---|---|
| 212,864 | Great Britain | Oct. 2, 1924 |

OTHER REFERENCES

"Cellulose and Cellulose Derivatives," E. Ott, 1943, pages 184–185.